United States Patent [19]

Laerdal et al.

[11] Patent Number: 4,797,104

[45] Date of Patent: Jan. 10, 1989

[54] SYSTEM AND METHOD OF TESTING A PERSON IN THE PERFORMANCE OF CARDIOPULMONARY RESUSCITATION

[75] Inventors: Tore Laerdal; Kjell Aamodth; Harald Eikeland, all of Stavanger, Norway

[73] Assignee: Asmund S. Laerdal, Stavanger, Norway

[21] Appl. No.: 81,317

[22] Filed: Aug. 3, 1987

[30] Foreign Application Priority Data

Nov. 8, 1986 [DE] Fed. Rep. of Germany ....... 3638192

[51] Int. Cl.$^4$ .......................... G09B 5/02; G09B 23/28
[52] U.S. Cl. ..................................... 434/265; 434/307; 434/428
[58] Field of Search ............... 434/262, 265, 307, 323, 434/428; 128/695

[56] References Cited

U.S. PATENT DOCUMENTS 4,278,095  7/1981  Lapeyre ............................. 128/707
4,360,345  11/1982  Hon ..................................... 434/262

Primary Examiner—Albert W. Davis, Jr.
Attorney, Agent, or Firm—Hoffmann & Baron

[57] ABSTRACT

In a system and a method of testing a person in the performance of cardiopulmonary resuscitation and for evaluating training exercises therein, a training device simulating a patient includes sensors for detecting various resuscitation procedures performed thereon. Parameter signals from the sensors are fed to a computer including a series of counters, a timing means and various memories, for analyzing the parameter signals and assessing whether the corresponding operations have been correctly or incorrectly performed. The values processed by the computer are then displayed on a display providing a clear moving representation of the procedures performed on the training device, the representation taking place in real time on the basis of corresponding signals from the timing means, whereby, by viewing the display, the trainee operator can directly check and if appropriate correct the resuscitation procedures he is performing. The display can display the whole of the cardiopulmonary resuscitation operation including preparatory procedures.

15 Claims, 5 Drawing Sheets

SYSTEM AND METHOD OF TESTING A PERSON IN THE PERFORMANCE OF CARDIOPULMONARY RESUSCITATION

BACKGROUND OF THE INVENTION

The importance of training lay persons and experts alike in emergency medicine and in particular in the resuscitation of accident victims, victims of heart attacks and the like has long been recognised. Therefore, training devices have been on the market for some years now, which substantially faithfully simulate a victim or patient requiring resuscitation, at least in the chest region, and on which the procedures required for resuscitation can be carried out for training purposes. Such resuscitation procedures include a series of preparatory procedures such as establishing lack of consciousness, for example by shaking, opening the air passages and establishing lack of respiration, delivering a few quick breaths of air to the patient by means of the mouth-to-mouth method or by means of a respiration mask, establishing absence of pulse, and so forth. The actual cardiopulmonary resuscitation procedure (CPR) then involves heart massage and artificial respiration which is precisely matched thereto, using the mouth-to-mouth method or using a respiration mask.

Correct performance of the CPR procedure is a matter of major importance as mistakes can result not just in injury to the patient but in particular lack of success in the attempted resuscitation. For that reason, instruction in CPR by means of the above-mentioned training devices must be closely monitored by experts and doctors and the persons receiving such instruction received their certificate of competence in the resuscitation procedures only when they have been able to carry out correctly at least 90% of the resuscitation procedures which they were required to perform in the course of testing. As training and testing in CPR procedures is a time-consuming process, which is a matter of disadvantage in particular in regard to the highly qualified experts and doctors who are to supervise the trainees and is therefore an obstacle to the wider spread of training in CPR procedures, various instruction systems and methods have been put forward, in which training is effected by means of computer-controlled audio-video equipment. A training system of that kind, as set forth in U.S. Pat. No. 4,360,345, seeks to replace the trainer or doctor completely or at least substantially, and to provide that the function of the trainer or doctor is carred out by a computer-controlled audio-video system which is capable of analysing resuscitation procedures carried out on a training device, establishing whether such procedures have been correctly or incorrectly performed, and, depending thereon, giving the trainee audio-visual instructions. Such instructions include inter alia realistic visual representations on the picture screen of a display device, which show the correct mode of operation in the resuscitation process, as well as spoken instructions which explain the correct method of operation and which also draw the attention of the trainee to the errors and mistakes that he has made. In the course of training, interaction between a trainee and the system repeatedly requires the trainee to operate the keyboard of the computer in order to continue with the training exercise.

Although that kind of instruction system can substantially avoid the need for the co-operation of trainers or doctors when carrying out the CPR procedures in a training situation, that system however does not satisfy all the requirements for realistic performance of a resuscitation procedure, due to the necessary interaction between the trainee and the system, which also includes operations which are not carried out directly on the training device. For, by virtue of having to carry out intermediate operations on the computer keyboard, the trainee is prevented from going straight through the resuscitation procedure even if the individual operations involved in resuscitation have otherwise been correctly carried out. In particular however this known instruction system is very expensive due to the level of apparatus expenditure which it involves, which has had a deterrent effect on the increased use thereof and which means that the aim that it seeks to achieve, namely making CPR accessible to a considerably larger number of the population, cannot be satisfactorily met.

Although the above-discussed instruction system made it possible to achieve an advance in terms of saving time from the point of view of the people required to supervise the test, a considerable amount of time is still involved in qualitative and quantitative evaluation of the resuscitation procedures under test conditions. The procedures are evaluated and judged in those respects on the basis of recordings of the parameters which characterise the various individual resuscitation operations, for example the amount of air supplied per ventilation when performing artificial respiration, the number of ventilations per unit of time, compression of the chest in the heart massage procedure, the duration of the individual compressions, the time sequence of the individual compressions, and so forth. Although the above-discussed instruction system does in fact already permit such recordings to be evaluated and analysed, because the results are already outputted by the computer itself in tabular form and in the form of charts, the results set out in the tables for each individual trainee have to be associated with a given evaluation standard and thus interpreted, which is a onerous and also time-consuming operation. Therefore, in order to evaluate a trainee in a fair manner such as to do justice to the trainee, it is still desirable to represent the recorder parameters which are characteristic in respect of the resuscitation procedures performed by the trainee, in such a way that the assessment thereof is available directly.

Finally, the known instruction system also provides for teaching a sequence of the above-mentioned preparatory procedures such as establishing loss of consciousness by shaking, opening the air passages, establishing respiration, feeling the pulse and so forth. However, the performance of those preparatory procedures is not included in the assessment, that is to say it is not possible subsequently to check whether the sequence and the timing of those preparatory procedures were correct.

SUMMARY OF THE INVENTION

An object of the invention is to provide a system for testing and assessing a person in the performance of cardiopulmonary resuscitation which, by means of a computer and a display arrangement, permits the assessment of the capabilities of the person being tested, at a considerably lower level of cost, without however adverse effects in regard to teaching capacity.

Another object of the present invention is to provide within a system for testing a person in the performance of cardiopulmonary resuscitation, a display arrangement which can be easily read off by the person being trained and which occupies only a small amount of space.

Still another object of the invention is to provide a system for testing and assessing a person in the performance of cardiopulmonary resuscitation, which directly following the conclusion of the test provides a quantitative and possibly also qualitative assessment on the basis of the test, with preparatory procedures being included in the assessment.

Still a further object of the present invention is to provide a system for practising in cardiopulmonary resuscitation procedures, in which the person practising the procedures is required to act only in relation to the training device and is in a position to check and possibly correct the correctness or incorrectness of the resuscitation procedures performed, by visually referring to symbolic representations on the display arrangement.

Yet a further object of the present invention is to provide a method of testing a person in the performance of cardiopulmonary resuscitation procedure and assessing the procedures performed by that person, which readily provides a reliable assessment result by the performance of a simple sequence of procedural operations.

These and other objects are achieved by a system for testing a person in the performance of cardiopulmonary resuscitation (CPR) and for assessing the correctness of training exercises in CPR, including a training device simulating a patient, comprising at least one sensor for the output of parameter signals defining characteristic parameters for a resuscitation procedure to be carried out on the training device. The system further includes a storage or memory means for parameter values which define a parameter minimum value for the recognition of procedures on the training device, as attempts in respect of resuscitation procedures, and upper and lower parameter limit values for the recognition of operating procedures on the training device, as correct resuscitation operating procedures. A computer is connected to the training device and the storage or memory means for receiving the signals from the at least one sensor, the computer comparing those signals to the respectively stored parameter values in the memory means and establishing the occurrence of a correct or an incorrect resuscitation procedure. A display means such as a liquid crystal display is controlled by the computer for displaying a symbolic or graphic representation of the training device, and a moving graphic representation of the parameter signals from the at least one sensor.

The invention also provides a method of testing a person in the performance of CPR and assessing the resuscitation procedure performed by that person, using a computer, a display arrangement such as a liquid crystal display and a training device which simulates a patient, including a sensor for detecting a resuscitation procedure carried out on the training device. The method provides for the storage of parameter values defining a minimum value for the recognition of operating procedures on the training device, as attempts at resuscitation procedures, and upper and lower limit values for the recognition of operating procedures, as correct procedures. Resuscitation procedures are then carried out on the training device whereby the sensor produces parameter signals. The parameter signals are compared to stored signals by the computer to detect any attempt at resuscitation procedure and any correct resuscitation procedures performed. A symbolic representation of the training device and an analog moving graphic representation of the parameter signals are produced on the display arrangement.

Further objects, features and advantages of the present invention will be apparent from the following description of preferred embodiments thereof.

DETAILED DESCRIPTION OF THE PREFERRED EMBODIMENTS

Figure 1A:
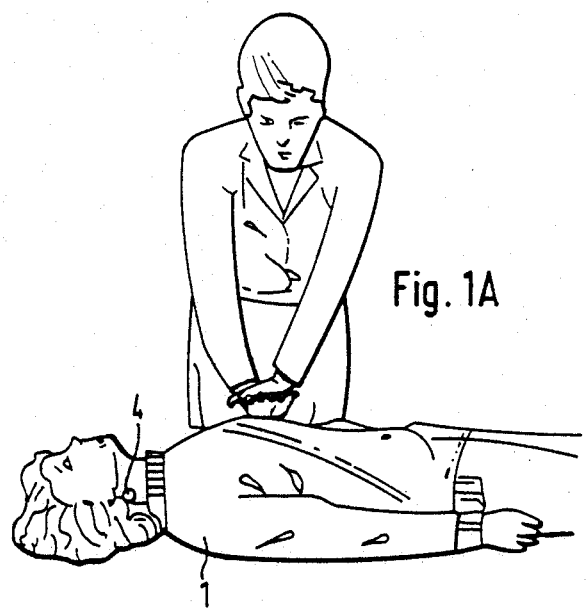
FIG. 1A is a diagrammatic view of a training device simulating a patient requiring treatment, and a person performing heart massage thereon.
Figure 1B:
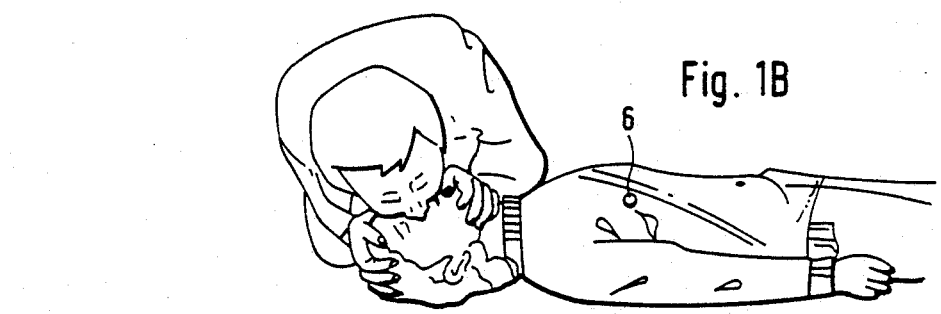
FIG. 1B is a similar view to that shown in FIG. 1A of a training device and a person performing mouth-to-mouth resuscitation.
Figure 1C:
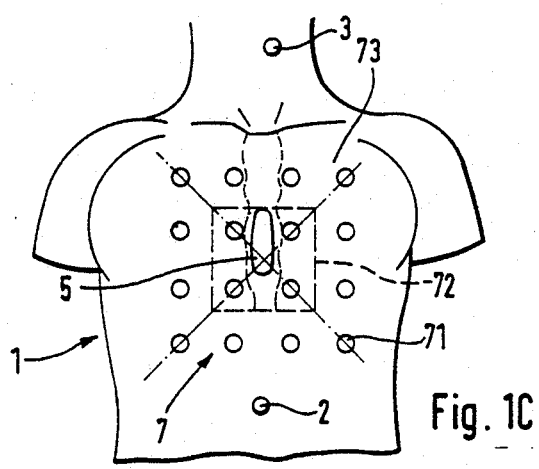
FIG. 1C is a diagrammatic plan view in partly cut-away form of the training device shown in FIGS. 1A and 1B, illustrating the position of a sensor for detecting compressions to be produced in heart massage and a sensor for determining the correct hand position for heart massage.

Referring firstly to FIGS. 1A through 1C, diagrammatically shown therein is a training device 1 which is used for the purposes of training and assessing people in the performance of cardiopulmonary resuscitation (also referred to as CPR). The device 1 substantially simulates a human body and is of such a design that at least the region thereof which is important in terms of resuscitation procedures, namely the chest region, is equivalent in terms of its deformation characteristics to the human chest area. It is also possible for the region of the neck in which the carotid artery is to be found in the human body to be equivalent in terms of its flexibility to the human body.

Disposed in the training device 1 are a number of sensors which measure the various physical parameters involved in measuring and assessing the resuscitation procedures to be individually performed, and convert them into measurement signals. Thus for example FIG. 1C illustrates a first sensor 2 which is fixed within the training device 1 at any point at which there is appropriate space, and which may be for example in the form of a mercury switch comprising a glass tube carrying the mercury and contacts actuatable thereby. In the position of the device 1 shown in FIG. 1A, the glass tube of the sensor 2 is held in a position in which no signal is produced. If the device 1 is shaken, which is the situation corresponding to a check as to whether the victim or patient simulated by the device 1 is unconscious, then the sensor 2 will also respond, that is to say, the mercury which moves in the tube of the sensor 2 containing same gives at least one signal pulse by virtue of the mercury coming into contact with the contact members of the switch.

Reference will also be made to FIG. 1C showing that a second sensor 3 is arranged in the region of the carotid artery, the sensor 3 being responsive to pressure and being so set that it produces a signal when a pressure which corresponds to feeling a pulse is applied by two fingers of a hand of the person using the training device 1.

Reference will also again be made to FIG. 1A showing the indication of a third sensor 4 which is arranged in the interior of the neck portion of the training device 1 in the region of an air passage (not shown) therein and which is responsive to whether the air passage is an open or a blocked condition. The third sensor 4 may be for example a potentiometer by means of which it is possible to detect inclined positioning of the head portion of the training device 1 in a rearward direction (being therefore downwardly when the training device 1 is in the recumbent position shown in FIG. 1A). It is only when the head is sufficiently inclined rearwardly, that is to say downwardly in FIG. 1, that the air passage simulated by the training device 1 is opened so as to permit suitable ventilation. The sensor 4 produces a signal only when the head portion of the device 1 has been moved into a suitably inclined position.

FIG. 1C shows the provision of a fourth sensor 5 which is in the form of a travel measuring device for measuring a distance covered, and serves to measure compression of the chest region of the training device 1.

Referring now to FIG. 1B, shown therein is a fifth sensor 6 which is arranged within the training device 1 to represent a lung and which is formed for example by a diaphragm member or an inflatable bellows, and which serves to detect the amount of air which is blown into the simulated lung in the ventilation phase.

Finally, as shown in FIG. 1C, arranged on the top of the chest region of the device 1 is a plurality of individual sensors indicated generally at 71 which in combination constitute a sixth sensor 7. The sensor 7 serves to detect correct hand contact when performing heart massage. The individual sensors 71 are arranged in a square pattern whose centre point is above the sensor 5 which is operable to detect chest compression in heart massage. Four of the individual sensors 71 are disposed around the centre point of the square pattern of sensors, within a square area indicated by broken lines at 72. Dash-dotted lines in a crossed configuration also define four 90° sectors as indicated at 73, the part of each sector 73 which is outside the square area 72 corresponding to those regions in which hand positioning in compression for heart massage is incorrect. The individual sensors 71 are connected in such a way that a signal representing correct hand positioning on the chest area is produced by the sensor arrangement 7 only when exclusively individual sensors 71 disposed within the square area 72 respond. If a sensor in the sectors 73 is also actuated, that produces a signal denoting incorrect hand positioning.

The arrangement and design configuration of the above-described sensors and of the training device are known, as disclosed for example in above-mentioned U.S. Pat. No. 4,360,345, and therefore do not need to be described in greater detail herein.

Figure 2A:
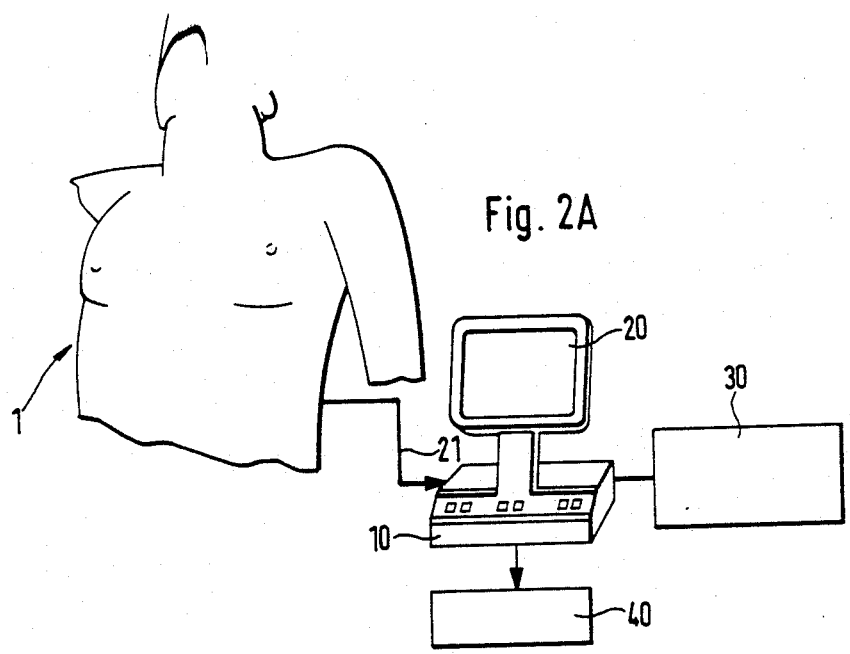
FIG. 2A is a diagrammatic block view of a system according to the invention.

Reference will now be made to FIG. 2A given a diagrammatic view of the structure in block circuit form of the system according to the invention which incorporates the training device 1 as an integral component thereof. Operatively associated with the device 1 is a computer 10 communicating with a display 20. The computer may also be connected to a printer 30 and a recorder 40 which however do not represent components which are essentially required in the system according to the invention.

Figure 2B:
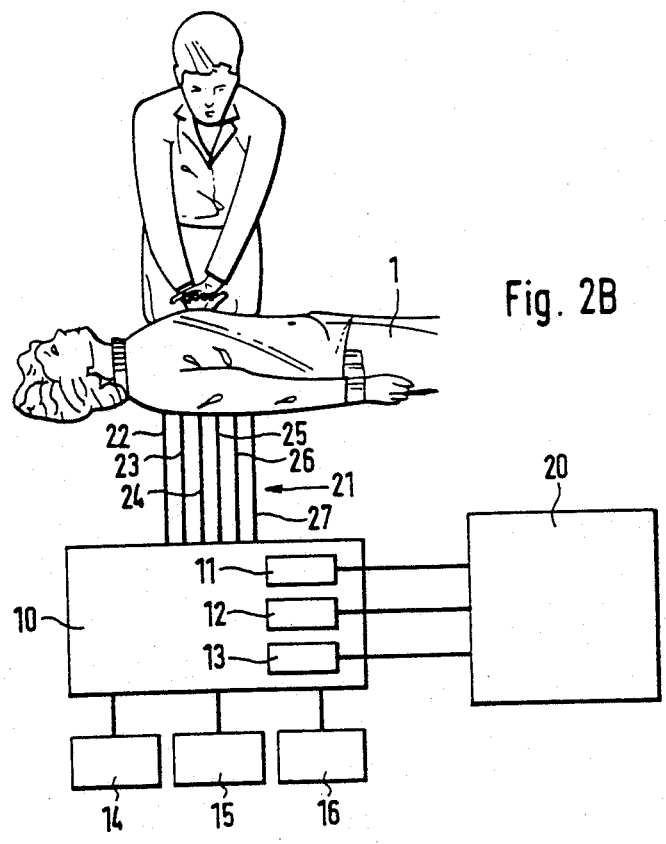
FIG. 2B is a further diagrammatic block view of the system according to the invention, illustrating in greater detail the connections between individual components of the system.

Referring now to FIG. 2B, shown therein is the diagrammatic layout of the system according to the invention, in terms of the connections between the individual components thereof. Accordingly, the sensors 2 through 7 are connected to the computer 10 for the transmission thereto of electrical parameter signals generated by the sensors 2 through 7, by way of lines 22 through 27 which overall form the communication as indicated at 21 between the device 1 and the computer 10. The computer 10 includes electronic counters 11 and 12 and a timing means 13, the purpose of which will be clearly apparent hereinafter. The computer 10 also communicates with three storage means or memories 14, 15 and 16, the function of which will also be described in greater detail hereinafter.

The counters 11 and 12 and the timing means 13 are connected to the display 20 so that the signals that they produce can be displayed in the form of digits on the display screen 20.

The computer 10 which is for example a microcomputer and the counters 11 and 12 which preferably constitute integral components of the computer 10, the timing means 13 and the memories 14 through 16 are conventional commercially available items or units which are capable of processing signals generated by the sensors 2 through 7. In that connection, the memories 14 through 16 contain parameter values which can be stored therein as read-only programmed values or which can be inputted by software means and which establish for given resuscitation procedures limits within which such procedures are deemed to be correct. Such resuscitation procedures include ventilation (respiration) of the lung and compression (heart massage) of the chest area, which must be correctly carried out not only in regard to the manner in which they are performed as a matter of principle, but in particular also in regard to their intensity, that is to say, their progressive extent. The memories 14 through 16 also contain minimum values in respect of the operating parameters involved, which must occur in the case of the above-mentioned resuscitation procedures so that such procedures can be assessed as an attempt at such procedures, even if they are deemed to be incorrectly performed, for example by virtue of being inadequate in terms of intensity. Thus for example adequate heart massage occurs only when the sternum of the patient's simulating device 1 is pressed downwardly (as viewing in FIG. 1A) by at least 38 millimeters in its lower region, being the position of the sensor 5 in FIG. 1C. If however the compression exceeds a travel of 51 millimeters, it is excessive and can put the patient at risk. Therefore, a necessary condition for a finding of correct heart massage being performed is that the chest region of the device 1 is compressed within a range of from 38 to 51 millimeters. On the other hand, a lower limit value of for example 5 millimeters is provided as the criterion in regard to the occurrence of an attempt at compression as part of a heart massage procedure. If the sternum is depressed by a distance of less than 5 mm, then that is assessed as not being an attempt at heart massage. Sternum depressions of that small order of magnitude may be caused by inadvertent contact or by other operating procedures being carried out on the training device 1.

In regard to respiration, correct respiration requires the delivery of an amount of air in a range of from 800 to 2000 ml. If the amount of air supplied is less than 800 ml, that does not constitute adequate respiration while if the amount of air exceeds 2000 ml, respiration is excessive. In order to establish whether the person using the device 1 has made any attempt at all at producing respiration on the device 1, which is accordingly to be taken into consideration in assessing the results of the operating procedures performed, it is established that the supply of an amount of air of for example less than 50 ml to the artificial simulated lung in the device 1 is deemed not to constitute an attempt at producing respiration. An amount of air of less than 50 ml may also be supplied for example by movements on the device 1, which do not originate from respiration. If such movements and the amount of air introduced into the lung in that situation were to be included in the assessment, that would give a false picture.

Moreover, in regard to correct assessment and evaluation of the resuscitation procedures performed, an important consideration is that a resuscitation procedure may be defective in a number of respects. Thus for example heart massage is incorrect when just one of the following errors occurs: insufficient or excessive compression of the chest area, prevention of complete expansion of the chest between successive compressions, maintenance of the depressed condition of the chest region for a period of less than 0.2 second, or applying the hands to the chest region at the wrong position. Mistakes may also occur in matching respiration to heart massage, for example in such a way that, when performing the CPR procedure by means of a single helper, the ratio of the number of respirations to the number of chest compressions in a cycle is incorrect. Therefore, besides the above-mentioned parameter minimum values, for example for inadequate or excessive compression of the chest, the system also provides those parameter minimum values which permit evaluation and assessment of the resuscitation procedures, in respect of the further errors referred to above. There is no need at this stage to enter into a detailed discussion thereof because the applicable criteria in such situations are known to those dealing with such matters, and from the point of view of the man skilled in the electronics or data processing art, can be readily converted into the necessary program or the software to be employed.

The system in accordance with the invention as shown in diagrammatic form in FIGS. 2A and 2B not only permits analysis of the resuscitation procedures carried out on the device 1 by the person being tested, but it also provides for qualitative and quantitative evaluation and assessment thereof. The evaluation is displayed directly at the display 20 so that the person being tested is immediately advised of errors in carrying out a resuscitation procedure, for example excessively strong or excessively weak compression in heart massage, and can correct that point in the next resuscitation procedure.

The display 20 is in the form of a liquid crystal display (LCD), the structural configuration of which is basically known. The LCD affords the option of displaying moving representations and images, while however occupying a considerably smaller amount of space and involving a considerably smaller amount of apparatus, than in the case of other monitors.

Referring now to FIGS. 3 through 6, shown therein is the display area of the display device 20 with various representations thereon, which are produced at the display 20 by the computer 10 in the course of performance of CPR on the device 1.

Figure 4:
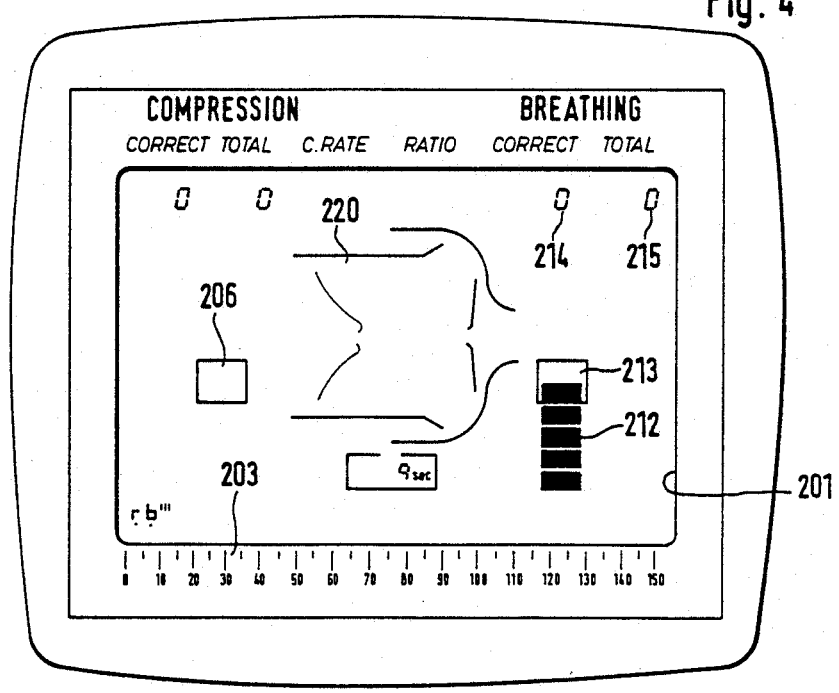

The actual display area as indicated at 201, which is formed by a liquid crystal panel is bordered by a frame 202 which has a time scale 203 in seconds at its lower edge and at its upper edge labels referring to the content of the display area 201. Thus the label 'COMPRESSION' relates to a representation 205 in the form of a column, consisting of a plurality of vertically superposed dark individual blocks and a light area 206 at the lower end thereof. The representation 205 is in the physical sense similar to compression of the chest region of the device 1, which is measured by the sensor 5, that is to say the column-like display 205 which occurs in the course of compression corresponds in respect of its length from top to bottom to the parameter signal supplied by the sensor 5. If the sensor 5 is not actuated, then the display 20 does not show any representation 205 and only the light area 206 is easy to see, as shown in FIG. 4. The significance of the area 206 will be described in greater detail hereinafter.

Figure 5:
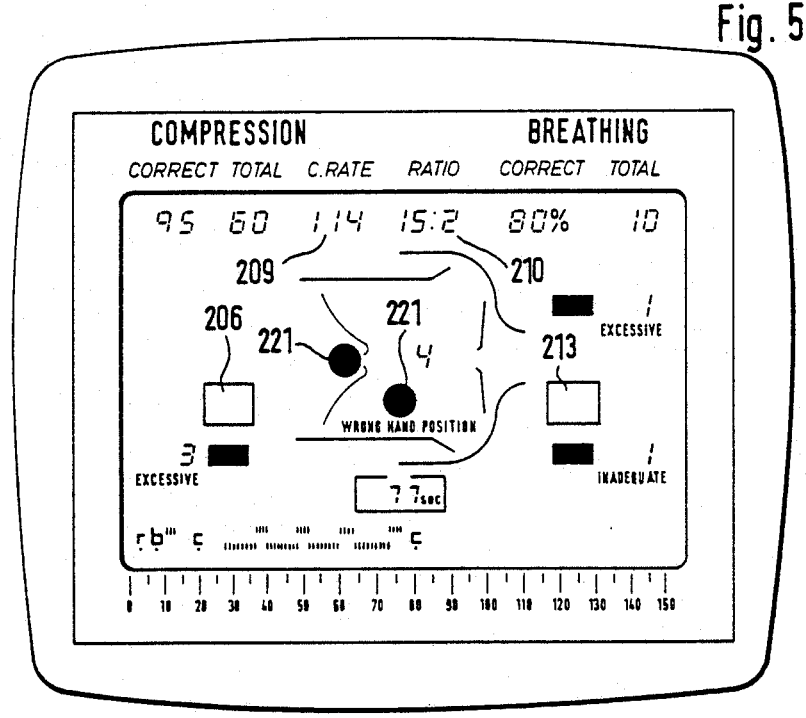
Figure 6:
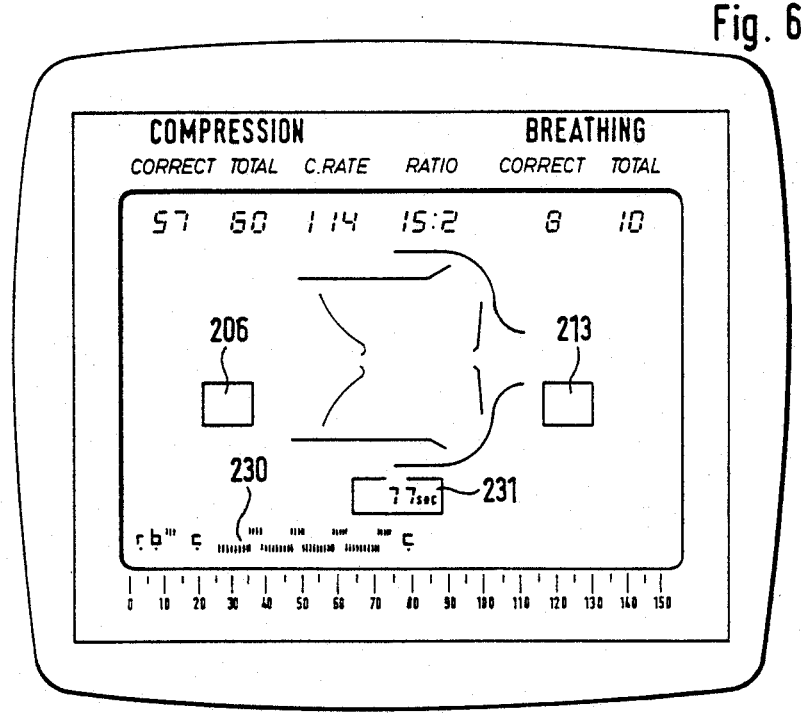

Below the label 'COMPRESSION' are two further labels, 'CORRECT' and 'TOTAL', which are associated with counter conditions 207 and 208. The counter conditions 207 and 208 give the number of compressions which have been correctly performed, and the total number, respectively. In that respect the number of correctly performed compressions is already related to the total number and is given as a percentage, as represented in FIG. 5. To the right of the labels 'CORRECT' and 'TOTAL' is a further label 'C. RATE' which is associated with a counter condition 209. The counter condition 209 gives the number of compression cycles per minute. A further label 'RATIO' relates to a counter display 210 reproducing the ratio of the number of compressions to the number of ventilations during a compression cycle, as shown on the chart in FIG. 7 to which reference will be subsequently made.

Disposed on the top right-hand portion of the frame 202 is the label 'BREATHING' which relates to a representation 212 which is once again in the form of a column and which permits evaluation of the respiration operating procedure being performed. The representation 212 corresponds to the representation 205 in respect of compression, but in this case it is developed in an upward direction in order thereby more clearly to represent the rise of the chest corresponding to respiration movement. The representation 212 constitutes the analog form of the parameter signal which is produced by the sensor 6 when performing a respiration operating procedure. At the upper end of the representation 212 is a lighter area 213, the significance of which will be described hereinafter. Once again, beneath the label 'BREATHING' are labels 'CORRECT' and 'TOTAL' which relate to counter conditions 214 and 215 respectively. They show the number of respirations which have been correctly performed, as a percentage, and the total number of respirations, respectively.

In the middle of the display panel 201 is a symbolic representation of the chest and the neck projection of the device 1, which representation appears constantly on the display panel 201, that is to say it appears as soon as the entire system is switched on, even if no resuscitation procedures are being performed on the device 1. The symbolic representation as indicated at 220 makes it possible by means of dark round areas 221, to indicate incorrect hand positions involved in for example heart massage, which positions differ from the correct hand positions, corresponding to the 90° sectors 73 shown in FIG. 1C in respect of the hand positioning sensor assembly at 7. The position of a round area 221 corresponds to the location of the respective 90° sector 73 in which the hand of the operator of the device 1 is incorrectly positioned. FIG. 5 shows two of the round areas 221, which means that hand positioning is incorrect insofar as it occurs in the bottom sector 73 and the right-hand sector 73 shown in FIG. 1C.

Disposed above the time measuring scale 203 in the display panel 201 is a display representing symbols in respect of the preparatory procedures, namely 'r' for detecting loss of consciousness (as by shaking), 'b' for detecting breathing and opening of air passages and 'c' for feeling the pulse. The points beneath the individual letters mark the period of time which has elapsed between the respective preparatory procedures performed. The lines which appear in superscript relationship to the letter 'b' also mark the number of short preparatory breaths which are blown into the simulated lung of the device 1. Then, following those symbolic representations of the preparatory procedures, and also in association with the scale 203, vertical lines at the same level as the time measuring points provide for symbolic representation of the compressions produced and, at the same level as the above-mentioned vertical lines corresponding to the short breaths introduced into the simulated lung, the number of ventilations occurring between compressions. That means that the display area associated with and arranged above the scale 203 provides a clear representation in respect of the timing of the entire resuscitation procedural operation including the preparatory procedures r, b and c which are important in relation thereto. The display area in question is generally denoted by reference 230 in FIG. 6 and disposed above same is a further area 231 in which the total duration of the resuscitation operations is displayed in seconds.

When performing the CPR procedure on the device 1, the mode of operation involved in the above-described system is as follows:

Firstly, the person being tested is required to perform the above-mentioned preparatory procedures. When they are carried out in the correct sequence, the result is successive response of the first sensor 2 in response to shaking of the device 1 to establish loss of consciousness, the third sensor 4 in response to opening of the air passages including checking respiration, and the second sensor 3 in response to feeling of they pulse. The corresponding signals in respect of 'consciousness' 'air passage open' and 'pulse' are passed by way of the lines 22 through 24 illustrated in FIG. 2B to the computer 10, compared in memories (not shown) which store corresponding parameter values, and then supplied to the display 20, in accordance with their timing which is determined by the timing device 13. Thereupon, the symbols 'r', 'b' and 'c' appear in the display area 20, in the corresponding sequence. If, and this is part of the preparatory procedures, the person being tested has blown a number of short breaths into the simulated lung of the device 1, after establishing respiration and opening of the air passages, then a corresponding number of vertical lines appears following the symbol 'b'. On the basis of the points marking the timing under the above-mentioned letter symbols, it is possible to read off whether an excessively long period of time has elapsed between the individual operating procedures; the sequence of the letters also indicates whether the preparatory procedures have been unacceptably interchanged. It will be appreciated that the absence of one of the letter symbols also indicates that a preparatory procedure has been completely omitted. A procedure is also deemed to be omitted if it has not been carried out with a sufficient amount of care, for example if the head of the device 1 has not been tipped sufficiently far back, for the purposes of opening the air passage, so that the sensor 4 has not produced the corresponding parameter signal.

Figure 7:
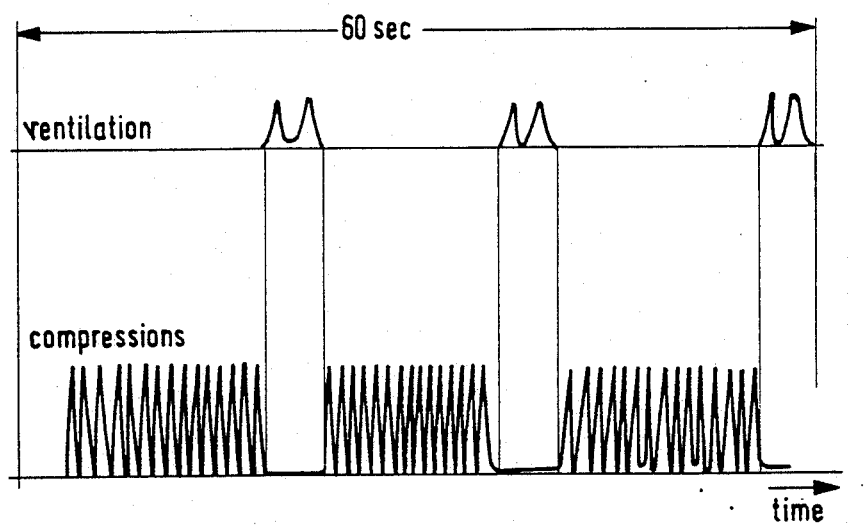
FIG. 7 is a chart showing the relationship in terms of time between respiration and heart massage.

When those preparatory procedures have been carried out and recorded on the display 20, with the corresponding display figures being frozen in the display area 230, there then begins a sequence of compressions and ventilations as shown as an ideal situation in FIG. 7. The representation applies in the situation where there is only a single helper (that is to say also only a single person to be tested) so that ventilations and compressions cannot be performed simultaneously but have to be carried out in succession. FIG. 7 shows that there is a correct association of ventilations and compressions when two ventilations are produced between successive sequences each consisting of 15 compressions. FIG. 7 also makes it clear that, with correctly performed heart massage, about three massage cycles each consisting of 15 compressions have to be performed within one minute.

Figure 3:
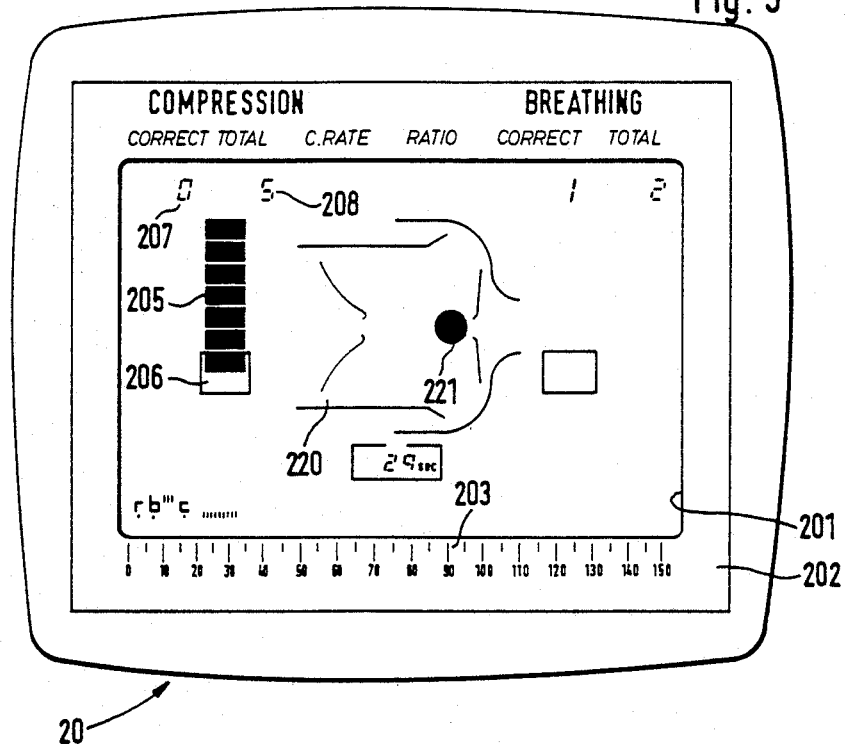
FIGS. 3 through 6 show similar views of the display arrangement with different displays corresponding to resuscitation procedures being carried out.

Correct performance of heart massage requires precise hand positioning on the chest region of the device 1, that being monitored by means of the sensor 7. If hand positioning is in the square area indicated at 72 in FIG. 1C, then hand positioning is correct and no error display signal 221 appears in the symbolic representation 220 of the display 20. If however incorrect hand positioning also causes the actuation of at least one individual sensor 71 (see FIG. 1C) outside the square area 72, in one or more of the 90° sectors indicated at 73, then an error signal 221 appears in the symbolic representation 220 at a location which corresponds to the appropriate 90° sector or sectors 73. Thus for example FIG. 3 shows that hand positioning is too high on the sternum, while FIG. 5 shows that hand positioning has been displaced inclinedly downwardly and towards the right when viewing FIG. 1C. As the corresponding error signals 221 instantly appear on the liquid crystal display panel 201 and instantly disappear again after the hands are removed from the device 1, the trainee can very quickly ascertain the correct hand positioning by observing the display 20.

The compressions which are now to be produced in the heart massage procedure cause activation of the fourth sensor 5 which measures depression of the chest region so that it supplies suitable 'compression' signals to the computer 10 by way of the line 25 shown in FIG. 2B. The memory 14 contains parameter values and minimum parameter values in respect of compression, as already described above, to which the successively received 'compression' signals are compared in order thereby to decide whether the respective signal can or cannot be considered as corresponding to correct compression. As already mentioned, compression is also checked in regard to correctness thereof, to ascertain whether the chest region has been sufficiently relieved of the load applied thereto again and whether the period of time for which a compression effect is maintained or which elapses between two successive compressions can be deemed to be correct. Each compression which is applied to the device 1 and which is measured by the sensor 5 is now clearly reproduced in the form of the symbolic representation 205 on the liquid crystal panel 201 of the display 20. In that case, the display shows successive representations, beginning from the top, in the form of the dark blocks shown in FIG. 3, marking the course of compression. If compression is to be considered correct in regard to its extent, then the blocks shown in FIG. 3 also reach the light area 206 which is particularly heavily illuminated, shaped or coloured in order to make it clearly visible to the trainee. If the area 206 is not activated but the dark blocks remain thereabove, then that display corresponds to a compression which is insufficient in extent. If compression is excessive, then although the light area 206 is activated, there appears a further block beneath the illustrated area 206 (see FIG. 5). At the same time the number of excessive compressions is specified therebeside, as can be clearly seen from FIG. 5 showing a dark block with the FIG. 3 therebeside. The blocks of the symbolic representation 205, which appear in a downward progression with each compression and which disappear again when the compression force is released, very clearly show the trainee the effects of his operating procedure and permit him in each case to provide for immediate correction in regard to intensity of compression, as soon as he finds that the light area 206 is not activated or is activated only from time to time. By virtue of the fact that the timing sequence of the compressions is also clearly displayed in the sequence display area 230 associated with the scale 203, the trainee can ascertain, by reference to the length of the compression sequences, whether he is performing the heart massage operation at an excessive low or an excessively high rate.

While the person being tested is carrying out the compression operation, the counter conditions in the counter 11 are suitably increased as compressions occur. The counter 11 counts both the number of attempts at compression, that is to say, those compressions which have caused a chest movement which corresponds at least to the minimum parameter value in respect thereof, and also compressions which have been correctly produced. Therefore, during the test program, the person being tested is provided with two counter conditions in each case, one of which reproduces the total number of attempted compressions, which appears under the label 'TOTAL', as well as the number of correctly performed compressions which immediately appears as a percentage, being calculated by the computer 10, under the label 'CORRECT'. In that way it is therefore possible immediately to evaluate and assess the heart massage procedure, both during and also at the end of the test program, by reference to the display areas 207 and 208.

The situation is similar in regard to the memory 15 which contains parameter values and minimum values relating to respiration. The computer 10 again compares the 'respiration' signal which has been inputted from the sensor 6 by way of the line 26 in FIG. 2B, to the parameter values in the memory 15, and in a similar manner to that described above in connection with the compression procedure, determines the number of attempted ventilations, and which number out of that total number of attempted ventilations is to be considered correct. The number of attempted ventilations and the number of correct ventilations are then counted in a counter 12 so that a display thereof can be provided by virtue of the counter conditions 214 and 215 of the display 20. In addition, during each ventilation, the symbolic column representation 122 on the liquid drystal display area 201 is activated. That display also provides a clear representation of respiration insofar as the height of the column of blocks which is produced upwardly in FIG. 4, as marked by black blocks therein, corresponds to the extent of the lift movement of the chest. When the artificial lung in the device 1 is filled with a sufficient amount of air, corresponding to correct ventilation, then the display 212 goes up to the light area 213 which once again is particularly strongly activated or formed in order to make it clearly visible to the trainee. If an excessively small amount of air is blow into the artificial lung in the device 1, then the area 213 is not activated; the display 212 only provides a number of dark blocks corresponding to the inadequate extent of ventilation, as shown for example in FIG. 5. If an excessive amount of air is blown into the artificial lung in the device 1, then although the area 213 is also activated,a further dark block also appears in clearly visible form therabove, as shown in FIG. 5. In both cases, that is to say, both with excessive and with inadequate ventilation, the number of ventilations to be evaluated and assessed is specified in numerical terms, beside the corresponding symbolic representation. Thus, on the basis of the symbolic representation 212, the trainee is enabled clearly to follow the effects of his respiration operating procedure and correct it immediately if an error should be noted. In that way, just by viewing the display 20, the trainee learns the correct feel for the amount of air to be delivered for respiration purposes.

On the assumption that only one helper is available (being a trainee or a person to be tested), a sequence of 15 compressions must be followed in each case by a sequence of from two to four ventilations. The trainee can follow the correct performance of such sequences and the number of individual compressions and ventilations per sequence, both graphically by reference to the display in the area 230 over the scale 203 and also digitally under the label 'RATIO' in the counter condition area 210 as shown for example in FIG. 5. The area 210 shows the ratio of compressions to interposed ventilations, the ratio being 15:2 in the example illustrated in FIGS. 5 and 6.

By virtue of the components used, the above-described instruction system in accordance with the principles of the present invetion involves a considerably lower level of expenditure without thereby adversely affecting effectiveness. The computer 10 may be a commercially available programmable computer or a microprocessor for controlling the liquid crystal display device 20. In particular, the use of the display device 20 reduces the level of expenditure involved in the system, while the option of representing moving images thereon provides the clear representation that the trainee requires, in the form of sequences of movements. Furthermore, independently of the use of a liquid crystal display, the representation of the complete performance of the CPR inclusive of the preparatory procedures in real time (that is to say in relation to a time measuring scale) provides the trainee with a very close approximation of the feel required for the timing involved and the time limits to be observed, which is very important if the CPR procedure is to be correctly carried out. As the LCD display can be disposed in a very small space, it is also possible for the display device 20 to be set up directly beside the device 1, in the field of vision of the person to be tested, for example advantageously at the side of the device 1 opposite to the person being tested thereon. A certain inclination of the display panel 201 rearwardly, as shown in FIG. 2A, ensures that in that position of the display, the display 20 is in the field of vision of the trainee without the trainee having to move out of the correct posture for performing the CPR procedure. That is not the case with the known instruction systems which operate with monitors of a different kind and which are positioned in a different fashion.

It is possible to deviate in various respects from the specific embodiment of the instruction system as described above, without departing from the scope of the invention:

Thus the example to improve ease of viewing of the representations which appear on the display device 20, during performance of the CPR procedures, it is possible to display only those (moving) representations which the trainee requires for evaluation and assessment purposes, in order immediately to be able to correct any incorrect procedures that he may have performed. That means that, in regard to heart massage, a display only appears in the areas 205 and 206 and therebeneath, corresponding to the extent of compression, while in the case of respiration procedure, a display only appears in the areas 212 and 213 and thereabove, corresponding to the amount of air which is blown into the artificial lung of the device 1, while in both cases there is also a display in the area 230. In any case an error display 211 will however also appear in the symbolic representation 220, if the trainee has used incorrect hand positioning. It is possible however not to provide the digital information. A further modification could provide that only those digital displays are omitted, which give the number of excessive or inadequate compressions and ventilations. That point also applies in regard to the digital display which can be seen in FIG. 5, in the middle of the symbolic representation 220, showing the frequency with which incorrect hand positioning occurs.

Yet another modification may provide that in principle there is no percentage evaluation during performance of the CPR procedure, so that below the respective labels 'CORRECT', the display shows not the percentage but the actual number of correctly performed compressions or ventilations respectively. By means of suitable connection to the computer 10, it would be possible after termination of the test to provide a representation on the display device, in which all digital values which at that time have not yet been displayed then appear. The representation could then be frozen in a similar manner to that shown in FIG. 5; in that case for example a block with the FIG. 3 therebeside is shown beneath the area 206. That means that, after the test has been concluded, the trainee can see that of all the compressions he produced, three were excessive. A similar consideration may also apply in regard to ventilation, with a respective block with a FIG. 1 therebeside occurring above and below the area 213, as can be clearly seen from FIG. 5. Such a representation following the test enables the trainee to review his main weaknesses in carrying out the resuscitation procedure, so that he can pay particular attention thereto in the course of his further training. Furthermore, although not shown in the illustrated representation of the specific embodiment, it would be possible to introduce an additional criterion in respect of respiration, which provides that an error display is produced if a ventilation is performed within an excessively short period of time. In actual fact, when resuscitating a patient or victim, a ventilation which is performed excessively vigorously and in which an amount of air which is in itself correct or even excessive is blown in within a very short period of time results in air passing into the stomach of the victim or patient. As that can put the victim or patient at risk and can also disguise failure of ventilation because although air has been supplied to the patient or victim it has not passed into the lung, a display in respect of that error is also an important consideration. In the representation illustrated herein in areas 212 and 213 of the display, that is readily possible by the computer 10 detecting the supply of respiration air within an excessively short period of time, and identifying that amount of air as being 'excessive', by a display in the area 213.

Finally it will be appreciated that, beside the recorder and printer which are shown in FIG. 2A and which can be connected as ancillary equipment to the computer 10, it is also possible to envisage connecting into the system a further computer, for example a PC, which can perform further processing operations on the data displayed at the display 20. For example it would be possible in that way for the results of CPR tests which have been successively carried out on the device 1 by a series of different people to be processed in the additional computer and a ranking list for example could be drawn up on the basis thereof.

It will be understood that this invention has been described hereinbefore with reference to a preferred embodiment thereof solely by way of example of the invention and that various modifications and alterations may be made therein without thereby departing from the spirit and scope of the invention.

What is claimed is:

1. A system for testing a person in the performance of cardiopulmonary resuscitation (CPR) and for evaluating the correctness of a training exercise in CPR, including:
    (a) a training device which simulates a patient, comprising at least one sensor for the output of parameter signals defining characteristic parameters for a resuscitation procedure to be carried out on the training device;
    (b) a memory means for storing parameter values which define
        (i) a parameter minimum value for the recognition of an operating procedure on the training device, as an attempt at a resuscitation procedure, and
        (ii) upper and lower parameter limit values for the recognition of an operating procedure on the training device as a correct resuscitation procedure;
    (c) a computer connected to the training device and the memory means for receiving the parameter signals from said at least one sensor, the computer being adapted to compare the parameter signals from the said at least one sensor to respective stored parameter values in the memory means thereby to detect the character of a resuscitation procedure in respect of correctness thereof, and
    (d) a liquid crystal display means controlled by the computer for displaying a symbolic representation of the training device and a moving graphic representation of the parameter signals from said at least one sensor.

2. A system as set forth in claim 1 wherein said display means additionally displays the ratio between the number of correct resuscitation procedures and the number of attempts at resuscitation procedures.

3. A system as set forth in claim 1 wherein said display means additionally displays symbols representing incorrect resuscitation procedures, which symbols are actuable by way of the computer by parameter signals from said at least one sensor in response to incorrect resuscitation procedures.

4. A system as set forth in claim 1 and including a further memory means for storing parameter values defining a series of preparatory procedures, and further sensors on said training device responsive to said preparatory procedures, wherein said display means is adapted to display symbols corresponding to the performance of said preparatory procedures and respectively activatable by parameter signals from said further sensors.

5. A system as set forth in claim 1 and further including a time measuring means for measuring the beginning, end and duration of said parameter signals, and wherein at least the spacing in respect of time of said parameter signals is adapted to be displayed on said display means.

6. A system for testing a person in the performance of CPR and for evaluating the correctness of a training exercise in CPR, including:
  (a) a training device for simulating a patient, having a simulation of a neck region, a chest region, air passages and a lung of a person, and including a plurality of sensors for the output of parameter signals comprising a first sensor responsive to shaking of the training device and adapted to output a consciousness signal when shaking occurs, a second sensor at the neck region responsive to feeling with the fingers of the person being tested and adapted to output a pulse signal when felt with a predetermined contact pressure, a third sensor at the air passages responsive to an open condition of the air passages and adapted to output an air passage open signal corresponding to said open condition, a fourth sensor at the chest region responsive to compression of the chest and adapted to output a compression signal when the chest region is compressed, a fifth sensor operatively associated with the lung and responsive to inflation of the lung and adapted to output a respiration signal when the lung is inflated, and a sixth sensor at the chest region responsive to the laying thereon of a hand of the person being tested and adapted to output a hand contact signal when the hand is laid on the chest;
  (b) a memory means for storing parameter values which define
  (i) a respective parameter minimum value in respect of recognition of operating procedures on the training device as attempts at shaking the training device, feeling the neck region, putting the air passages into the open condition, compressing the chest region and a respiration movement of the lung, and
  (ii) upper and lower parameter limit values for recognition of said procedures on the training device, as correct resuscitation procedures;
  (c) a computer connected to the training device and the memory means for receiving the parameter signals from said sensors and adapted to compare said parameter signals from said sensors to the respective stored parameter values in said memory means and thereby to establish the nature of a resuscitation procedure in terms of correctness;
  (d) a time measuring means actuable by the respective parameter signals of the sensors and adapted to measure the period of time elapsing after the first response of the first through fifth sensors respectively, and
  (e) a display means controlled by the computer and the time measuring means and adapted to display in relation to a time axis in real time mode a graphic representation of the parameter signals of the first through fifth sensors.

7. A system as set forth in claim 6 wherein the display means additionally displays the ratio between the number of correct resuscitation procedures and the number of attempts at resuscitation procedures.

8. A system as set forth in claim 6 wherein said display means additionally displays symbols representing incorrect resuscitation procedures, which symbols are actuable by way of the computer by parameter signals from said respective sensor in response to incorrect resuscitation procedures.

9. A system as set forth in claim 6 and including a further memory means for storing parameter values defining a series of preparatory procedures, and further sensors on said training device responsive to said preparatory procedures, wherein said display means is adapted to display symbols corresponding to the performance of said preparatory procedures and respectively activatable by parameter signals from said further sensors.

10. A system as set forth in claim 6 and further including a time measuring means for measuring the beginning, end and duration of said parameter signals, and wherein at least the spacing in respect of time of said parameter signals is adapted to be displayed on said display means.

11. A system as set forth in claim 6 wherein the display means is also adapted to display a symbolic representation of the training device and an analog representation of the parameter signals of the fourth and fifth sensors.

12. A system as set forth in claim 6 wherein said sixth sensor comprises a plurality of sensor units including a first group arranged in a part of the chest region in which hand contact is correct and a second group arranged outside said part of the chest region, said sixth sensor being operable to supply a hand contact signal which signals correct hand contact only when no sensor unit of said second group is activated.

13. A system as set forth in claim 12 wherein said sensor units of said second group are divided into four sub-groups which are each associated with a respective 90° sector outside said part of the chest region in which said hand contact is correct.

14. A system as set forth in claim 13 wherein a hand contact signal can be blended into said symbolic representation of said training device on said display means, in accordance with a response by at least one said sensor unit of one of said four sub-groups at a corresponding location of said symbolic representation, as a marking means.

15. A method of testing a person in the performance of CPR and evaluating the resuscitation procedure performed by that person, using a computer, a display means and a training device which simulates a patient, and in which there is provided at least one sensor for detecting a resuscitation procedure carried out on the training device, the computer, display means and training device being coupled together, comprising the following steps:
(a) storage of parameter values which define
  (i) a parameter minimum value for the recognition of an operating procedure on the training device, as an attempt at a resuscitation procedure, and
  (ii) upper and lower parameter limit values for the recognition of an operating procedure on the training device as a correct resuscitation procedure;
(b) the performance of a resuscitation procedure by the person being tested on the training device and the production of parameter signals by said at least one sensor;
(c) recognition by the computer of an attempt at a resuscitation procedure and a correct resuscitation operating procedure by comparison of said parameter signal from said at least one sensor with said stored parameter values; and
(d) production of a symbolic representation of the training device and an analog moving graphic representation of the parameter signals on said display means.

* * * * *